United States Patent [19]

Ueda et al.

[11] 4,299,122

[45] Nov. 10, 1981

[54] FORCE TRANSDUCER

[75] Inventors: Toshitsugu Ueda; Fusao Kousaka, both of Musashino, Japan

[73] Assignee: Yokogawa Electric Works, Ltd., Tokyo, Japan

[21] Appl. No.: 83,282

[22] Filed: Oct. 10, 1979

[30] Foreign Application Priority Data

Oct. 11, 1978 [JP] Japan ................. 53-124756

[51] Int. Cl.³ .............................................. G01L 1/10
[52] U.S. Cl. .......................... 73/862.59; 73/DIG. 1
[58] Field of Search .......... 73/141 A, 141 R, DIG. 1, 73/704, 579, 580, 581

[56] References Cited

U.S. PATENT DOCUMENTS

| | | | |
|---|---|---|---|
| 3,479,536 | 11/1969 | Norris | 73/DIG. 1 |
| 3,486,383 | 12/1969 | Riordan | 73/DIG. 1 |
| 4,009,608 | 3/1977 | Ormond | 73/141 A |

FOREIGN PATENT DOCUMENTS

| | | | |
|---|---|---|---|
| 219268 | 8/1968 | U.S.S.R. | 73/DIG. 1 |
| 559135 | 9/1977 | U.S.S.R. | 73/DIG. 1 |

Primary Examiner—Anthony V. Ciarlante
Attorney, Agent, or Firm—Parmelee, Johnson, Bollinger & Bramblett

[57] ABSTRACT

A force transducer is provided comprising a vibrator having a pair of plate-shaped vibrating pieces parallel with each other, coupling pieces for joining the respective ends of the vibrating pieces, and attachment portions connected to the coupling pieces, exciting means for causing the vibrator to resonate, and sensing means for detecting the vibrations of the vibrator. An input force to be converted is applied in the longitudinal direction of the vibrating pieces. This force transducer is capable of converting an industiral process variable such as force, pressure, difference pressure, weight or level into a proportional frequency signal at a high efficiency.

14 Claims, 16 Drawing Figures

FORCE TRANSDUCER

BACKGROUND OF THE INVENTION

1. Field of the Invention

The present invention relates to a force sensing transducer designed for converting an input force such as compressive force or tensile force into a frequency signal. The force transducer is adapted for wide application to a variety of instruments and apparatus including pressure gauges, gravimeters, differential pressure gauges and level meters.

2. Description of the Prior Art

FIG. 1 illustrates the operating principle of a conventional force-to-frequency transducer known heretofore, in which a bar 1 having a uniform cross section is anchored at two ends thereof on a base 10 such as a case. Supposing now that an axial force S exerted toward the center of the bar 1 is applied to each of the stationary ends thereof, the relationship set forth in Equation (1) exists between the axial force S and the lateral vibration frequency f of the bar when $1 > K_2 l^2 / EI\,S$:

$$f = \frac{K_1}{2\pi l^2} \sqrt{\frac{EIg}{\rho A}} \left(1 - K_2 \frac{l^2}{EI} S\right)^{\frac{1}{2}}$$

in which
- l: length of bar 1
- E: longitudinal elastic modulus of bar 1
- I: secondary moment of cross section related to main axis perpendicular to direction of vibration
- g: gravitational acceleration
- $\rho$: density of bar 1
- A: cross-sectional area of bar 1
- S: axial force (compressive force - positive)
- $K_1$, $K_2$: constants determined by bar support conditions and vibration mode.

Since the resonant frequency $\omega$ is represented by $2\pi f$, the axial force S applied is obtainable by measuring the resonant frequency $\omega$ of the bar 1.

In such a transducer, the conditions for attaining a high-precision force measurement must satisfy the following requirements:

(i) High stability in the frequency f, signifying that the vibrator (bar 1) has a high Q factor.

(ii) Great frequency change rate $\Delta f / \sigma$ per unit stress.

$$\left(\Delta f = \frac{f_{s=s} - f_{s=o}}{f_{s=o}},\ \sigma = \frac{S}{A}\right)$$

The goodness G of the above transducer can be expressed as $$G = Q \cdot \Delta f / S \cdot A \tag{2}$$

In the structure of FIG. 1, the input axial force S is obtainable by causing the bar 1 to resonate and measuring its resonant frequency $\omega$. However, during vibration as shown in FIG. 1B, a reaction force R is generated at each end of the bar 1 anchored to the base 10 and this force is consumed as a loss unless the base 10 is an ideal stationary end, thereby inducing a reduction in the Q factor of the bar 1.

SUMMARY OF THE INVENTION

It is an object of this invention to provide an improved force transducer of a simplified construction which is capable of performing an efficient operation with a minimum loss of vibrational energy and which can be readily manufactured.

In carrying out this invention in one illustrative embodiment thereof, a force transducer is provided comprising a vibrator having a pair of vibrating pieces having a longitudinal axis and being parallel with each other, coupling pieces for joining the respective ends of the vibrating pieces with each other, exciting means for causing the vibrating plates to resonate, and sensing means for detecting the vibration frequency of the vibrating plates, wherein an input force to be measured is applied in the longitudinal direction of the vibrating plates. Such a structure is effective in eliminating the problems that have been left unsolved according to the prior art.

DESCRIPTION OF THE PREFERRED EMBODIMENTS

Figures 1A, 1B:
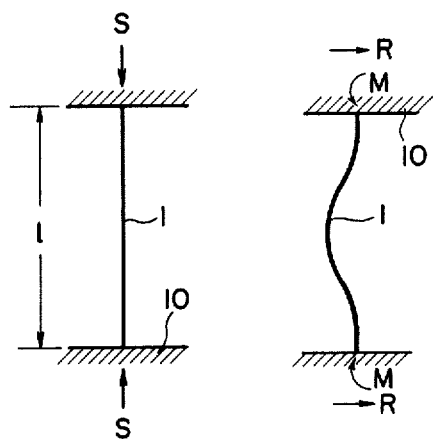
FIGS. 1A and 1B are diagrams illustrating the operating principles of a conventional force transducer.
Figures 2A, 2B, 2C:
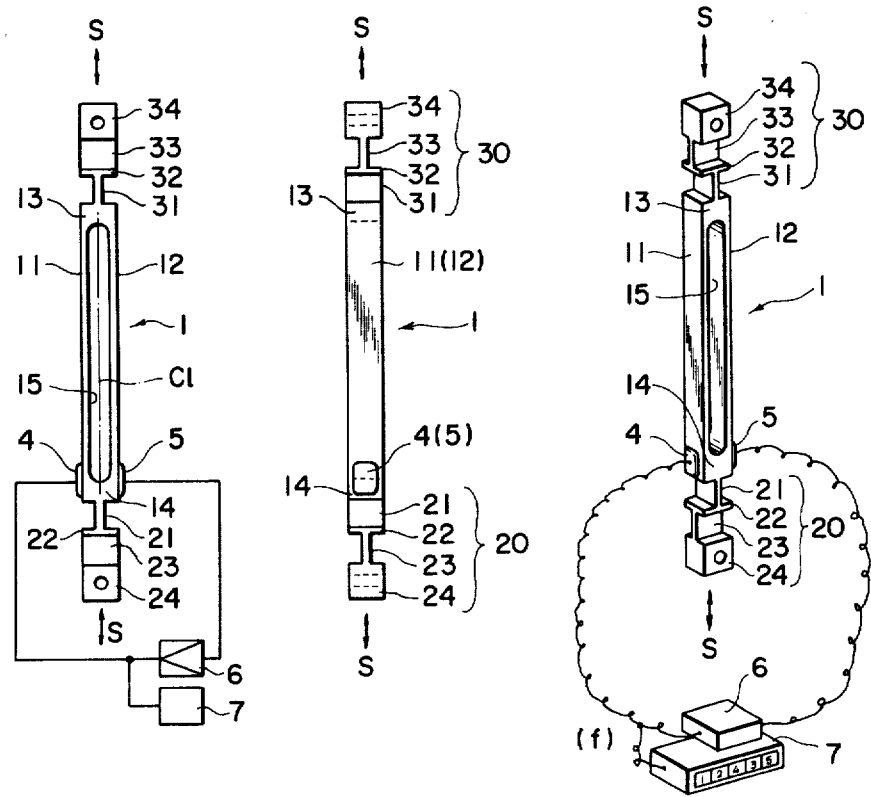
FIG. 2A is a front elevational view of an exemplary embodiment of a force transducer according to the present invention also illustrating the vibration sensor in block form.
FIG. 2B is a side elevational view of FIG. 2A without the vibration sensor.
FIG. 2C is a perspective view of FIG. 2A.

Referring now to FIGS. 2A through 2C, a vibrator 1 is equipped with a pair of plate-shaped vibrating pieces 11 and 12 which are symmetrical with respect to a center axis Cl and are parallel with each other. A pair of coupling pieces 13 and 14 join the respective ends of the vibrating pieces 11 and 12 with each other. In the example shown, these component pieces are produced out of a single columnar block by cutting the same in the manner to form a through hole 15 in the longitudinal direction to obtain vibrating pieces 11 and 12 symmetrical with respect to the center axis and also to form coupling pieces 13 and 14 with the remaining portions at the two ends of the through hole 15. Plate-shaped flexures 21 through 23 and 31 through 33 orthogonal with each other and attachment pieces 24 and 34 are formed in the direction of extension of the coupling pieces 13 and 14 and are connected thereto. These flexures and attachment pieces constitute attachment parts 20 and 30 of the vibrator 1, via which an input force S to be measured is applied to the vibrating pieces 11 and 12 in the longitudinal direction. An exciting element 4 secured to the vibrating piece 11 and a vibration sensor 5 secured to the vibrating piece 12 constitute an oscillator in cooperation with an amplifier 6 and the vibrator 1. The exciting element 4 and the vibration sensor 5 may comprise, for example, piezoelectric elements. A frequency meter 7 is provided for measuring the oscillation frequency of the oscillator including the vibrator 1.

In the structure described above, an input force to be measured is applied as an axial force to the vibrator 1 via the attachment parts 20 and 30 as indicated by an arrow S in FIGS. 2A through 2C. When the input force varies, the resonant frequency of the vibrator also varies in accordance with the input force as is manifest from Equation (1), thereby varying the oscillation frequency of the oscillator. Consequently, the value of the axial force S applied to the vibrator 1 is obtained through measurement of the oscillation frequency f by the frequency meter 7.

Figure 3:
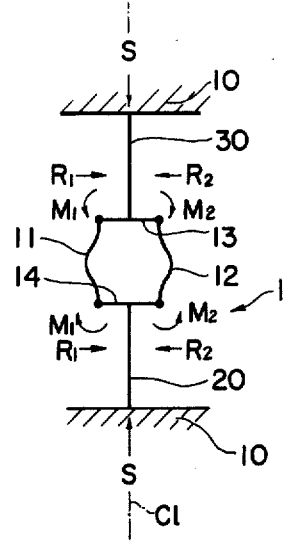
FIG. 3 is a schematic diagram of the equivalent structure illustrating the operating principles of the vibrator shown in FIGS. 2A through 2C.

Referring now to the equivalent mechanical schematic diagram of FIG. 3, if the vibrating pieces 11 and 12 are vibrated in a symmetrical mode with respect to the center axis Cl, the vibrations thereof are effected in mutually opposite directions as illustrated, so that the reaction forces $R_1$, $R_2$ and the moments $M_1$, $M_2$ generated at the juncture between the vibrating piece 11 and the coupling pieces 13 and 14 and also at the juncture between the vibrating piece 12 and the coupling pieces 13 and 14 are equal in value but are opposite in direction to each other ($R_1 = -R_2$ and $M_1 = -M_2$). Therefore, $R_1$ and $R_2$, and also $M_1$ and $M_2$ cancel each other in the coupling pieces 13 and 14, so that no force is eventually generated at the connection point of the vibrator 1 to the base 10. Consequently, regardless of how the vibrator 1 is supported on the base 10, no leakage of the vibrational energy occurs from the vibrator 1 toward the base 10. And thus, an excellent vibrator is obtainable with a high Q factor which signifies a great value of goodness G. Moreover, as the vibrator 1 is held by means of plate-shaped flexures orthogonal with each other, it becomes possible to prevent generation of an error that results from a deviation of the center axis caused by an attachment error when securing the vibrator 1 to the base 10 while isolating the same from the case and so forth with regard to vibration.

Figure 4A:
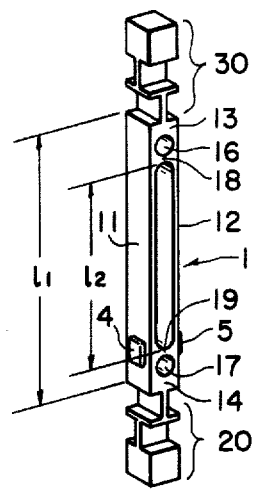
FIG. 4A is a perspective view of another embodiment of this invention.
Figure 5A:
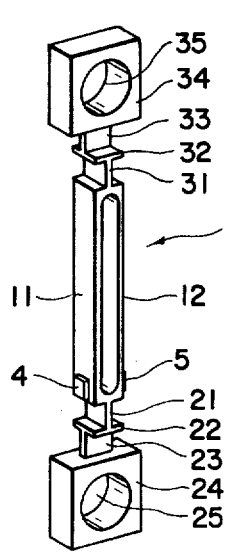
FIG. 5A is a perspective view of another embodiment of the invention.
Figure 5B:
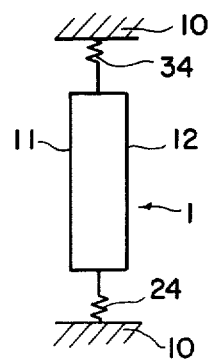
FIG. 5B is a schematic diagram of the equivalent structure of FIG. 5A.
Figure 6:
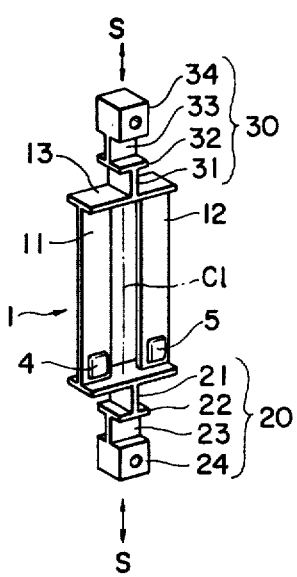
FIG. 6 is a perspective view of another embodiment of the invention.

FIGS. 4 through 6 are perspective views showing the structures of other embodiments of the invention.

Figure 4B:
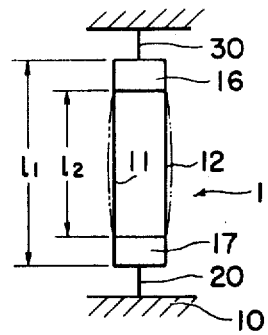
FIG. 4B is a schematic diagram of the equivalent basic structure of FIG. 4A.

In the embodiment of FIG. 4, through holes 16 and 17 are formed in coupling pieces 13 and 14 which join the ends of the vibrating plates 11 and 12. Due to this structure, the length $l_2$ of the vibrating pieces 11 and 12 operates dominantly in symmetrical mode oscillation which is illustrated by the broken lines in FIG. 4B, while the length $l_1$ including the coupling pieces 13 and 14 operates dominantly in non-symmetrical mode oscillation providing a difference between the resonant frequencies in the symmetrical mode and the non-symmetrical mode. Consequently, the vibrator is rendered oscillatable with facility and stability in the symmetrical mode. Furthermore, the side walls 18 and 19 of the through holes 16 and 17 are permitted to serve as portions of the vibrating pieces.

In the embodiment of FIG. 5A, through holes 25 and 35 are formed in attachment pieces 24 and 34, respectively, so as to decrease the longitudinal elastic constants of the attachment pieces 24 and 34. As is illustrated in FIG. 5B, satisfactory vibrational isolation is ensured between the vibrator 1 and the base 10 by the pieces 24 and 34 which effectively prevent the outflow of the vibrational energy from the vibrator 1 to the base 10.

In another embodiment shown in FIG. 6, a pair of vibrating pieces 11 and 12 are composed of flat plates which are symmetrical with respect to a center axis Cl and are parallel with each other in the same plane.

In each of the above embodiments, the exciting element 4 and the vibration sensor 5 may be formed by evaporating or sputtering piezoelectric material directly on predetermined regions of the vibrating pieces to function as thin-film type piezoelectric elements. In such a case, a higher Q-factor is attainable with enhanced productivity.

Alternatively, the vibrator 1 may be made of a magnetic material in which case both excitation and detection of vibration would be effected by means of coils in a non-contact manner.

Furthermore, the vibrator, the exciting element and the vibration sensor may be combined to constitute a single structure by the use of a piezoelectric material, for example, in crystalline form. In such form, electrodes may be deposited on the piezoelectric crystal by the art of evaporation or the like and incorporated in the vibrator 1. According to the above method, excellent characteristics are achievable with a low output impedance in a relatively simple construction. In this case, cutting of the crystal and location of the electrodes may be so selected as to cause bent vibration of the vibrating pieces 11 and 12.

Although the foregoing embodiments employ plate-shaped vibrating pieces, it is to be understood that they may be shaped into bars as well. Moreover, in addition to the above embodiments where the vibrator and the support portions of predetermined shape are produced out of a columnar block to constitute a single structure, it is also possible to assemble a similar structure by combining individual component parts.

FIGS. 7 through 11 show examples of apparatus each employing the force transducer of this invention.

Figure 7:
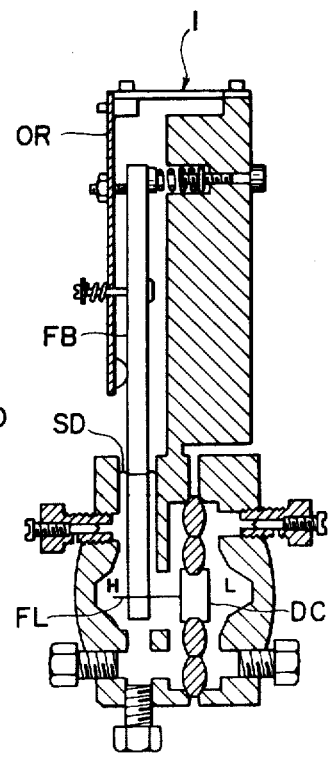
FIG. 7 shows the force transducer of this invention in a differential pressure gauge which is partly in cross-section.
Figure 8:
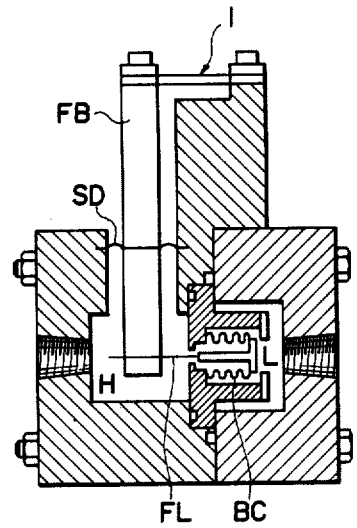
FIG. 8 illustrates the use of the force transducer of the present invention in another differential pressure gauge, partly in cross-section.

FIGS. 7 and 8 illustrate the incorporation of a force transducer in a differential pressure gauge. In the example of FIG. 7, a diaphragm capsule DC generates a force corresponding to the difference between pressures H and L introduced to the two sides thereof. The force thus generated is transmitted to one end of a force bar FB via a flexure FL. The force bar FB is supported by a seal diaphragm SD and transmits the force, which is received via the flexure FL, to a vibrator 1 by way of an over-range mechanism OR. Due to such a structure, the natural vibration frequency of the vibrator 1 varies in accordance with the force applied, so that the differential pressure to be measured is obtained from the natural vibration frequency.

In the example of FIG. 8, input pressures H and L to be measured are introduced to the two sides of a bellows capsule BC.

Figure 9:
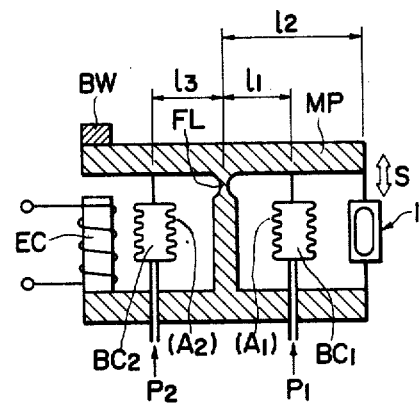
FIG. 9 shows the force transducer employed in a pressure gauge, partly in cross-section.

FIG. 9 illustrates how the force transducer is applied in a pressure gauge. A movable plate MP supported by a flexure FL is equipped with bellows $BC_1$ and $BC_2$ which are disposed to be substantially symmetrical with respect to the flexure FL. Each of the bellows $BC_1$ and $BC_2$ is attached via an eccentric member. A balance weight BW is mounted on one end of the movable plate MP so as to eliminate an attitude error, and an exciting coil EC is provided for magnetically attracting the weight BW to compensate for temperature error. The balance weight BW and the exciting coil EC are dispensable. In FIG. 9, an axial force S exerted onto the vibrator 1 is expressed as $$S = l_1/l_2 P_1 A_1 - l_3/l_2 P_2 A_2 \quad (3)$$

in which
- $A_1$, $A_2$: effective areas of bellows $BC_1$, $BC_2$
- $P_1$, $P_2$: pressures applied to bellows $BC_1$, $BC_2$
- $l_1$: distance between flexure FL and bellows $BC_1$
- $l_2$: distance between flexure FL and vibrator 1
- $l_3$: distance between flexure FL and bellows $BC_2$.

If the condition $l_1 A_1 = l_3 A_2$ is satisfied in Equation (3), it may be rewritten as $$S = K(P_1 - P_2) \quad (4)$$
$$K = l_1 A_1/l_2 = l_3 A_2/l_2$$

Therefore, the pressure can be obtained from fo and fs, in which: fo denotes the resonant frequency of the vibrator when $S=0$, i.e., $P_1 = P_2$ or $P_1 = P_2 = 0$; and fs denotes the resonant frequency of the vibrator 1 when $P_1$ and $P_2$ are equal.

According to the mechanism shown in FIG. 9, the component parts are minimized in number to accomplish simplification of the structure. By the use of eccentric members for attaching the bellows $BC_1$ and $BC_2$, adjustment is facilitated to satisfy the condition $l_1 A_1 = l_3 A_2$ even when any difference exist between the effective area $A_1$ and $A_2$ of the bellows or any positional error of the attached bellows in relation to $l_1$ and $l_2$. Since the example of FIG. 9 constitutes a pressure gauge by itself, it can be incorporated as a pressure gauge unit into another mechanism. For instance, measurement of a gauge pressure or an absolute pressure is rendered possible by installing such a unit in a case.

Although in FIG. 9 the vibrator 1 is located at the right end alone, another vibrator of the same characteristic may be provided at the left end as well. Then the natural vibration frequency of each vibrator 1 is changed differentially to attain improvements in the sensitivity and the signal-to-noise ratio.

Figure 10:
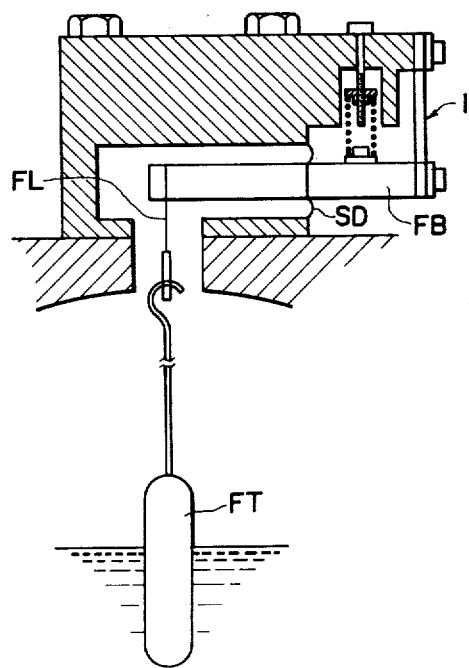
FIG. 10 illustrates the use of the force transducer in a level meter.

FIG. 10 illustrates the force transducer applied in a level meter, wherein a variation in the gravity of a float FT on a liquid level to be measured is fed to a vibrator 1 via a flexure FL and a force bar FB supported by a seal diaphragm SD.

Figure 11:
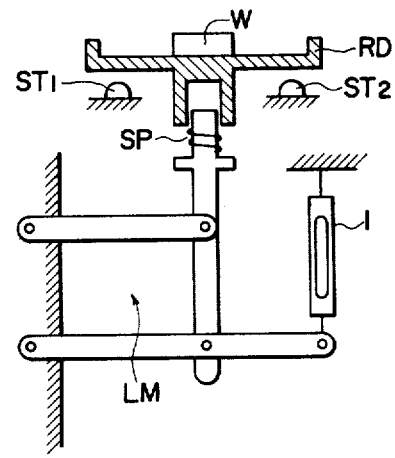
FIG. 11 illustrates the employment of the force transducer of the present invention in a gravimeter.

In FIG. 11 illustrating the exemplary employment of the force transducer in a gravimeter, a weight W to be measured is applied to a vibrator 1 via a Loberval mechanism LM consisting of a receiving dish RD and parallel links. Stoppers $ST_1$ and $ST_2$ serve to protect the Loberval mechanism LM and the vibrator 1 in such a manner that the dish butts against them when an overweight object is placed on the dish.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. A force transducer for converting an applied input force to be measured into an oscillation frequency comprising: a vibrator having a pair of vibrating pieces disposed parallel to each other and symmetrical with respect to the center axis thereof, coupling pieces for joining the respective ends of said vibrating pieces, and attachment portions connected to said coupling pieces; exciting means secured to one of said vibrating pieces for causing said vibrator to resonate; vibration sensing means secured to the other of said vibrating pieces for detecting the vibration of said vibrator; an amplifier coupled between said exciting means and said vibrating sensing means which along with said vibrator form an oscillator, an input force to be converted being applied to said vibrating pieces in the longitudinal direction thereof via said attachment portion, said input force varying the frequency of oscillation of said oscillator whereby said input force may be measured by measuring the frequency of oscillation of said oscillator.

2. The force transducer as defined in claim 1, wherein through holes are formed in said coupling pieces so that the natural vibration frequency of said vibrating pieces which vary in accordance with the input force applied thereto becomes different in symmetrical mode oscillation and non-symmetrical mode oscillation.

3. The force transducer as defined in claim 1, wherein through holes are formed in said attachment portions so as to decrease the longitudinal elastic constants thereof.

4. The force transducer as defined in claim 1, wherein said vibrating pieces are composed of flat plates which are symmetrical with respect to the center axis thereof and are parallel with each other on one plane.

5. The force transducer as defined in claim 1, wherein said vibrating pieces, coupling pieces and attachment portions are composed of a common member to constitute a single structure.

6. The force transducer as defined in claim 1, wherein said exciting means and vibration sensing means consist of piezoelectric elements.

7. The force transducer as defined in claim 6, wherein said piezoelectric elements are evaporated thin films.

8. The force transducer as defined in claim 1, wherein said vibrating pieces, exciting means and vibration sensing means are composed of a piezoelectric material to constitute a single structure.

9. The force transducer as defined in claim 1, wherein said attachment portions consist of plate-shaped flexures orthogonal with each other.

10. The force transducer as defined in claim 1, wherein the input force to be converted corresponds to the difference between pressures introduced to the two sides of a diaphragm capsule.

11. The force transducer as defined in claim 1, wherein the input force to be converted corresponds to the difference between pressures introduced to the two sides of a bellows capsule.

12. The force transducer as defined in claim 1, wherein the input force to be converted corresponds to a pressure introduced to a bellows.

13. The force transducer as defined in claim 1, wherein the input force to be converted corresponds to the weight of a float on a liquid level.

14. The force transducer as defined in claim 1, wherein the input force to be converted corresponds to the weight of an object.

* * * * *